United States Patent [19]

Combe

[11] Patent Number: 4,557,447
[45] Date of Patent: * Dec. 10, 1985

[54] PIPE CLAMP

[76] Inventor: Hubert Combe, Lankwitzer Str. 39, 1000 Berlin 42, Fed. Rep. of Germany

[*] Notice: The portion of the term of this patent subsequent to Oct. 4, 2000 has been disclaimed.

[21] Appl. No.: 508,071

[22] Filed: Jun. 24, 1983

Related U.S. Application Data

[63] Continuation-in-part of Ser. No. 319,544, Nov. 9, 1981, Pat. No. 4,407,479.

[30] Foreign Application Priority Data

Feb. 1, 1983 [EP] European Pat. Off. ........ 83730009.4

[51] Int. Cl.[4] .............................................. F16L 3/08
[52] U.S. Cl. ..................................... 248/74.1; 248/62
[58] Field of Search ............... 248/74 RB, 59, 58, 62, 248/72, 67.7, 231.6, 316.8, 230; 411/188, 389, 161; 403/97; 24/21, 22, 23 EE, 23 R, 284

[56] References Cited

U.S. PATENT DOCUMENTS

| 28,164 | 5/1860 | Dubs | 24/23 B |
|---|---|---|---|
| 593,906 | 11/1897 | Pound | 24/284 |
| 628,882 | 7/1899 | Werner | 24/284 |
| 649,270 | 5/1900 | Collins | 248/59 |
| 847,620 | 3/1907 | Thompson | 24/284 |
| 906,806 | 12/1908 | Kortick et al. | 248/62 |
| 2,318,946 | 5/1943 | Kass | 24/282 |
| 2,364,982 | 12/1944 | Kaufmann | 24/22 |
| 2,466,247 | 4/1949 | Land | 248/62 |
| 2,592,690 | 4/1952 | Harris | 24/23 EE |
| 2,780,429 | 2/1957 | Vanier | 248/59 |
| 2,842,878 | 7/1958 | McFadden et al. | 42/21 R |
| 2,996,274 | 8/1961 | Marik et al. | |
| 3,223,371 | 12/1965 | Miller | 403/97 |
| 3,276,172 | 10/1966 | Alvdén | 411/389 |
| 4,391,317 | 7/1983 | Savage | 24/20 LS |
| 4,407,479 | 10/1983 | Combe | 248/59 |

FOREIGN PATENT DOCUMENTS

| 0053089 | 8/1981 | European Pat. Off. | |
| 513962 | 12/1930 | Fed. Rep. of Germany | |
| 2541980 | 12/1978 | Fed. Rep. of Germany | |
| 0002788 | of 1913 | United Kingdom | 24/284 |
| 1129246 | 10/1968 | United Kingdom | |

Primary Examiner—William H. Schultz
Assistant Examiner—Ramon O. Ramirez
Attorney, Agent, or Firm—Thomas Schneck

[57] ABSTRACT

A pipe clamp having two clamp segments held together by a bridge piece. The bridge piece features interlocking segment ends. Opposite the bridge piece, a tensioning member is used to tighten the pipe clamp. The tensioning member includes two axially parallel, back-to-back bolts connected at their heads and passing through portions of opposed clamp segments.

8 Claims, 10 Drawing Figures

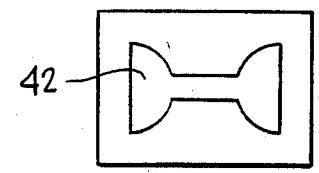
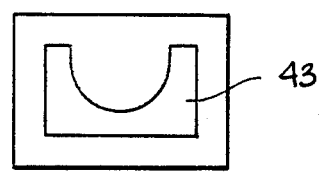
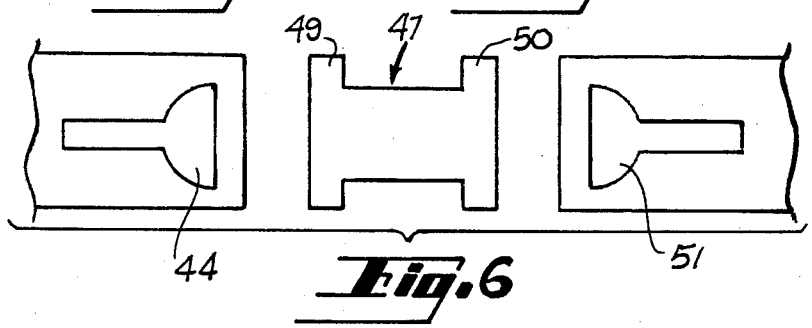
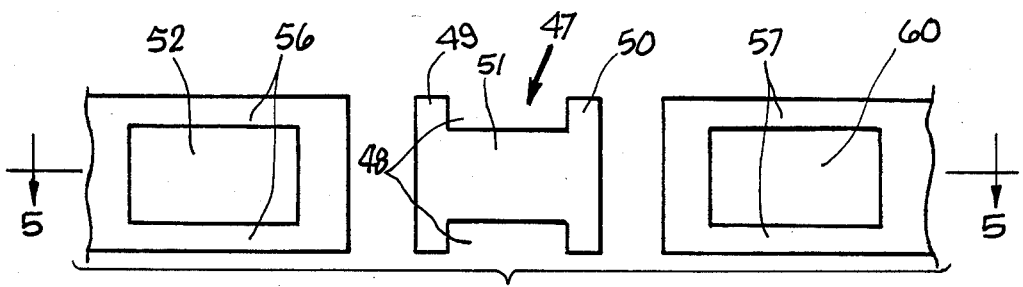
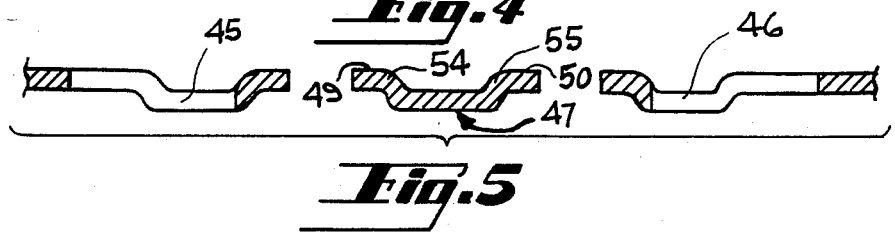

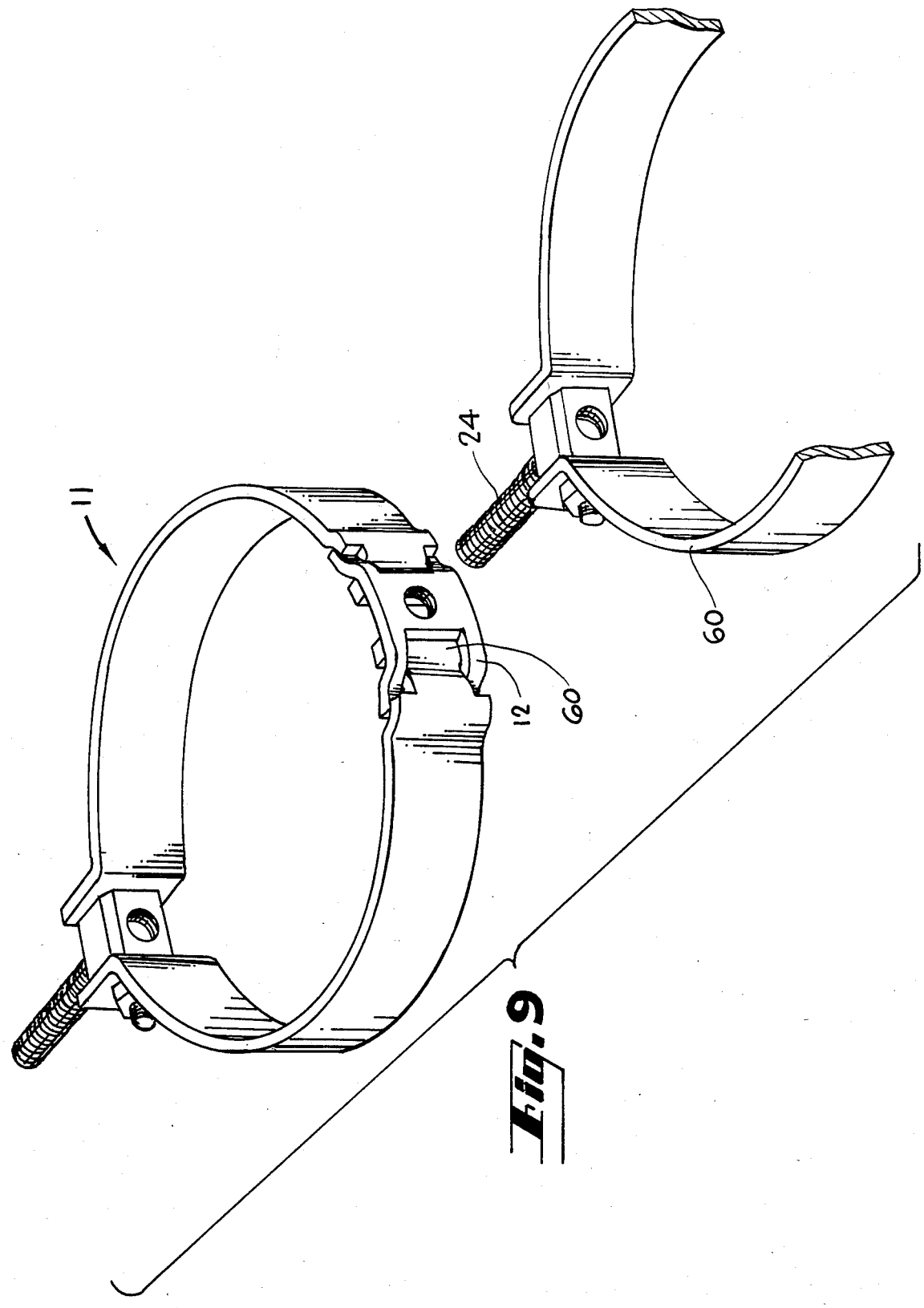

PIPE CLAMP

CROSS REFERENCE TO RELATED APPLICATION

This is a continuation-in-part of application Ser. No. 319,544 filed Nov. 9, 1981, now U.S. Pat. No. 4,407,479 granted Oct. 4, 1983.

TECHNICAL FIELD

The present invention relates to pipe clamps and in particular to segmented clamps.

BACKGROUND ART

Pipe clamps having two clamp segments joined by a threaded bolt and a bridge piece are disclosed by German Pat. No. 2,541,980. This type of pipe clamp features a bridge piece which has hook-like ends. The pipe clamp segment ends are similarly hooked and the hook ends fit together in the assembled state in such a manner that a positive lock occurs. Even though the bridge piece forms a coupled joint with the segment ends, this pipe clamp has the disadvantage that the bridge piece will drop off the segment ends upon loosening the threaded bolt on the other segment ends causing difficulties in clamp assembly. Furthermore, the segment-bridge joint is not completely stable because the hook ends could bend out of shape. In addition, the space requirements in the area of the bridge piece are considerable.

Other known pipe clamps feature a hinge joint between the two clamp halves. Such a hinge is disadvantageous because of its high costs and space requirements. This disadvantage of large size is not evident in another type of clamp, which utilizes as a joint a steel spring which is riveted to clamp segment ends. Both of the last-mentioned clamp types, however, have the common disadvantages that their effective clamp diameter is not adjustable and that they are expensive.

Accordingly, the claimed invention has the object of eliminating the disadvantages of these known types of clamps.

DISCLOSURE OF INVENTION

The above object has been met with a segmented pipe clamp having adjacent, circumferentially spaced pairs of ends. A first pair of ends is connected by a bridge piece which interlocks with each member of the first end pair. A second end pair is connected by a tensioning member which features back-to-back bolts, connected at their heads, passing through opposed second end pair members.

The pipe clamp, according to this invention, makes possible a connection of segments and offers all the advantages of a hinge but can easily be disassembled and does not bulge. There are no protruding parts to the bridge piece to present a danger of injury.

The pipe clamp has alternate embodiments which present various constructional advantages. Exceptional space efficiency can be achieved by providing offset bends in the areas of the clamp segment ends and bridge ends resulting in a complementary fit with an inside curvature corresponding to the outside pipe curvature.

Pipes of a certain rated diameter having varying outside diameters as a result of different materials and rated pressures. The bridge piece for the pipe clamp can be manufactured in different lengths and stored. One segmented pipe clamp can then be used for different outside pipe diameters by using the appropriately sized bridge piece. The tension of the clamp segments around the pipe is maintained by the tensioning member at the other end of the clamp segment. Consequently, a simplified method of inventory keeping is possible.

A second pipe clamp can be mounted to an existing clamp by placing a screw head in the bridge piece which would accept a threaded bolt fastened to a joint on another clamp.

Assembly of the clamp segments and bridge piece may also be simplified by having the openings in the bridge piece or clamp segment ends T-shaped or U-shaped. This would prevent an unintentional falling apart of the joint during assembly.

The two clamp segments may be of equal length or may be of two different lengths with an offset of the bridge piece from a position directly opposite the tensioning member. This arrangement simplifies installation when suspension clamps are used.

BRIEF DESCRIPTION OF DRAWINGS

FIGS. 3a and 3b are top views of bridge pieces for use with the pipe clamp of FIG. 1.

FIG. 4 is a top view of an alternate embodiment of a bridge piece assembly.

FIG. 5 is a sectional view taken along lines 5—5 of FIG. 4.

FIG. 6 is a top view of another alternate embodiment of a bridge piece assembly.

FIG. 9 is a perspective view of a pair of pipe clamps of the present invention for mutual connection.

BEST MODE FOR CARRYING OUT THE INVENTION

Figure 1:
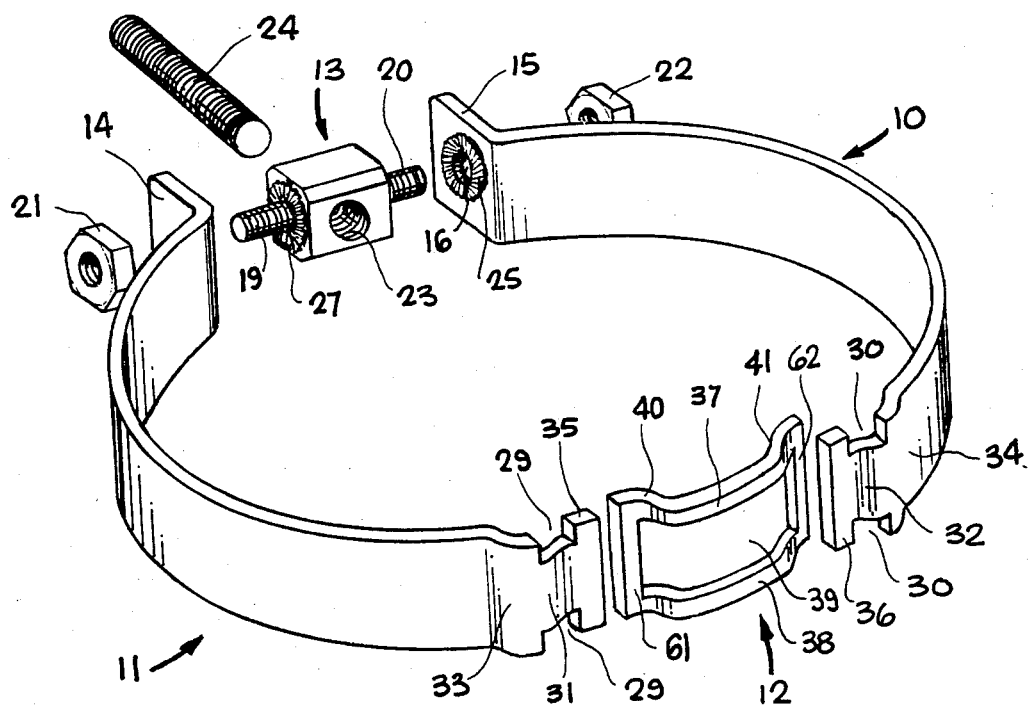
FIG. 1 is an exploded perspective view of a pipe clamp according to the present invention.

In FIG. 1 is shown an exploded view of an embodiment of the pipe clamp of the present invention consisting of two equal length clamp segments 10 and 11, a bridge piece 12, and a joint member 13. Each clamp segment has a curvature matching the outside pipe diameter and features coupling parts at each end. The coupling part at one end consists of facing flanges 14 and 15 with a hole in flange 15 and a corresponding hole in flange 14, not visible in this view.

These flanges 14 and 15 with holes allow tightening of both clamp segments 10 and 11 by a tensioning member, e.g., by means of a threaded bolt which may be placed through the holes.

In the preferred embodiment, in place of a bolt and nut, FIG. 1 shows the use of a joint member 13 with two axially located threaded bolts 19 and 20 and holding nuts 21 and 22. Joint member 13 is also provided with a through bore 23 vertically to the center line axis of threaded bolts 19 and 20 which serves for convenient attachment of the clamp to a threaded rod 24.

As described in co-pending patent application Ser. No. 319,544, now U.S. Pat. No. 4,407,479 each of the inner flange surfaces of the clamp segments may be provided with serrated surfaces, i.e., annular spiral type radial gear-tooth system 25 as shown around hole 16 with another around the hole on flange 14, one right turning and one left turning. The two faces of joint member 13, around the threaded bolts 19 and 20 can also be provided with annular radial gear-tooth systems as shown by 27 around bolt 19. Clamp segments 10 and 11 may be connected with two configurations of joint member 13. In one, tooth system 25 and the tooth system at the base of 20 mesh. Similarly, tooth system 27 and the tooth system on flange 14 mesh. Alternatively, the joint is rotated 180° and the tooth systems 25 and 27 contact and tooth systems on flange 14 and at the base of 20 contact. Joint member 13 is rigidly connected with clamp segments 10 and 11 when system 27 meshes the mirror image system on flange 14 and system 25 meshes with the mirror image system at the base of 20. If the joint member 13 is turned around 180°, i.e., in position such that system 25 is contacting system 27, they no longer mesh and if they are suitably shaped, there is no positive locking. When joint member 13 is not rigidly mounted it can float around the axis defined by threaded bolts 19 and 20. Both types of linkage of joint member 13 with the clamp segments, 10 and 11, the rigid and the rotatable linkage, are needed for pipe installation.

It is equally desirable that each clamp can be tightened around a pipe. Because of the different outside diameters of pipes of the same nominal diameter, this was, up to now, only possible by adjusting the clamp diameter by means of a second tension bolt at the other coupling ends, which however, often interfered.

For this reason, according to the present invention, as shown in FIG. 1, clamp segments 10 and 11 have, as another coupling part, a different configuration. Just ahead of each clamp segment end are two recesses 29 or 30 between which remains a neck 31 or 32. In a preferred embodiment, the area of the neck 31 or 32 and the wider area just ahead of it is provided with an outward bend 33 or 34 which extends parallel to the pipe across the entire width of the bridge and clamp. At the end of each clamp segment is terminal point 35 or 36 as a normal continuation of the clamp segments 10 and 11. The offset short ends 61 and 62 of a bridge piece 12 lock into the bends 33 and 34 in such a manner that the cross beams 37 and 38 interlock with the segment ends 35 and 36, as shown in FIG. 2, forming an inside curvature corresponding to the outside pipe curvature.

Figure 2:
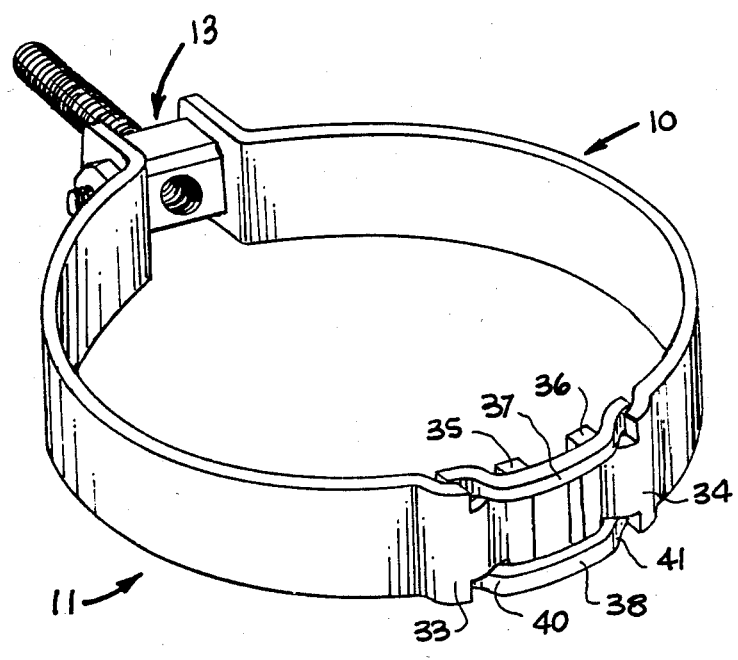
FIG. 2 is a perspective of the assembled pipe clamp of FIG. 1.

As shown in FIG. 1 and FIG. 2, bridge piece 12 is approximately the width of the clamp segments 10 and 11 and, at least, of such a length that it will accommodate an opening 39 long enough to permit insertion of both segment ends 35 and 36. The width of the opening 39 corresponds to the width of the necks 31 and 32. Cross beams 37 and 38 of bridge piece 12 are provided with offsets 40 and 41. Bends 33 and 34 on the clamp segments 10 and 11 and offsets 40 and 41 on the bridge piece are correlated in such a manner that the overlapping areas of the clamp segments 10 and 11 and bridge piece 12 fit closely as shown in FIG. 2. In addition, the bridge piece has a curvature which corresponds to the outside pipe curvature. Bridge pieces of varying lengths allow adaptation of the same clamp segments 10 and 11 to fit varying pipe outside diameters while retaining the tension.

FIG. 3a shows examples of dual T-shape openings 42 and FIG. 3b shows U-shaped openings 43 in bridge piece 12. The shapes of these openings reduce the danger that, upon pipe installation, the joint formed by the bridge piece would fall apart.

FIG. 4 shows an alternate configuration having a double T-shaped bridge piece 47 for locking into corresponding openings in the two segment ends. The bridge piece 47 of this embodiment features two opposing recesses 48 forming T-shaped ends 49 and 50. The width of the neck 51 between the ends corresponds to the width of the openings 52 or 60 in the two segment ends. The length of the openings 52 or 60 allows insertion of the T-shaped ends 49 and 50 of the bridge piece. As shown in the sectional view of FIG. 5, the bridge piece 47 has offsets 54 and 55 just prior to ends 49 and 50 forming T-bars which lock on the segment cross beams 56 and 57 and openings 52 and 60. Segment ends are provided with bends 45 and 46 into which offset bridge end pieces 49 and 50 fit in such a manner that the inside curvature of the pipe clamp corresponds to the outside pipe curvature.

An alternate embodiment of this configuration having a double T-shaped bridge piece 47 and T-shaped openings 44 and 51 in the two clamp segment ends is illustrated by FIG. 6. The T-shape of the openings has the advantage that outward bends 45 and 46 of the segment ends as shown in the cross section of FIG. 5 are not weakened too much by the openings.

Assembly possibilities of the described clamp are variable. In many cases it is recommended to rigidly connect joint member 13 to clamp segment 10 and then loosely attach clamp segment 11 to it by means of bridge piece 12 or 47 rather than using temporary clamps as often practiced. In this case, temporary placement of a pipe line is possible before the clamp is fastened directly to clamp segment 10 and assembly time is shortened.

Figure 7:
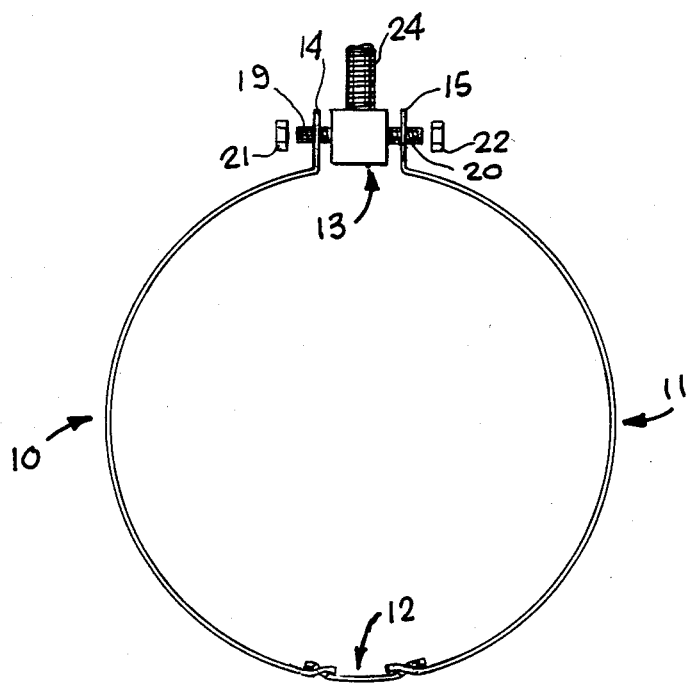
FIG. 7 shows an assembly plan of the pipe clamp of FIG. 1.

FIG. 7 shows the clamp assembly where two equal length clamp segments 10 and 11 are joined by a tensioning member bolt at one end and a bridge piece 12 directly opposite. Tension is achieved on a pipe in the clamp by tightening the two flanges 14 and 15 against the joint member 13 by means of nuts 21 and 22 on threaded bolts 19 and 20. Threaded rod 24 attached to joint member 13, may serve as a suspension means for the pipe clamp. If the bridge piece 12 is provided with a screw head, 60, as in FIG. 9, to accept a threaded rod 24 then it is possible to conenct a second clamp to an existing clamp 10 by means of a rod 24 fastened to a joint on the clamp.

Figure 8:
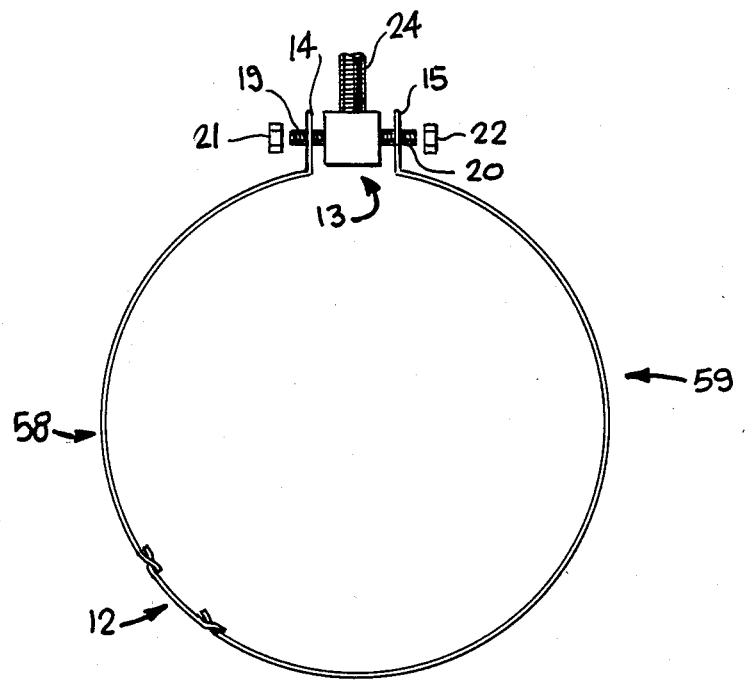
FIG. 8 shows an assembly plan of an alternate embodiment of the pipe clamp of the present invention.

Another embodiment is shown in FIG. 8 in which the bridge piece is not positioned directly opposite a threaded bolt but is placed between different lengths of collar segments 58 and 59. This arrangement makes temporary placement of pipes in one clamp segment easier than with a suspended pendulum type clamp. Tension is achieved for final clamping by means of joint member 13, bolts 19 and 20 and nuts 21 and 22 being tightened against flanges. Support for the temporary placement of the pipe is maintained by rod 24 attached to joint member 13.

I claim:
1. A pipe clamp comprising,
two facing oppositely curved clamp segments having adjacent, circumferentially spaced pairs of ends, a first end pair connected by a bridge piece forming an interlocking relation with each member of the end pair the interlocking first pair of ends and the bridge piece following the curvature of the curved clamp segments, the clamp segments having flat contact areas facing each other at the second end pair, the contact areas having inwardly facing, annular, first serrated surfaces defining holes within each annular surface, a joint member joining the second end pair having a central region of larger diameter and at least one end region of narrower diameter, the central region terminating on opposite sides in annular second serrated surfaces for engaging the first serrated surfaces of the contact areas, the end region of narrower diameter passing through a hole in an annular surface and having means for clamping the joint member relative to the contact areas.

2. The pipe clamp of claim 1 wherein the first end pair of said clamp segments has shaped openings and said bridge piece has opposed correspondingly shaped projections fitting into said shaped openings in an interlocking manner.

3. The pipe clamp of claim 1 wherein the first end pair of said clamp segments has shaped projections and said bridge piece has opposed correspondingly shaped openings receiving said shaped projections in an interlocking manner.

4. The pipe clamp of claim 1 wherein the first end pair of said clamp segments has bent sections, and said bridge piece has opposed bent sections, said bent sections cooperating in forming said interlocking relation.

5. The pipe clamp of claim 1 wherein said joint member connecting the second end pair of said clamp segments includes two axially parallel, back-to-back, threaded bolts connected at their heads, each bolt head having an annular serrated surface facing the threads.

6. The pipe clamp of claim 5 wherein said joint member has a bore therethrough into which a rod may be inserted.

7. The pipe clamp of claim 1 wherein the pipe clamp has a bridge piece of selectable length length, thereby providing a pipe clamp of selectable size.

8. The pipe clamp of claim 1 wherein said bridge piece contains a threaded head.

* * * * *